J. E. MATEER.
PROTECTIVE DEVICE FOR ELECTRICAL APPARATUS.
APPLICATION FILED JULY 17, 1912.
1,186,815.
Patented June 13, 1916.
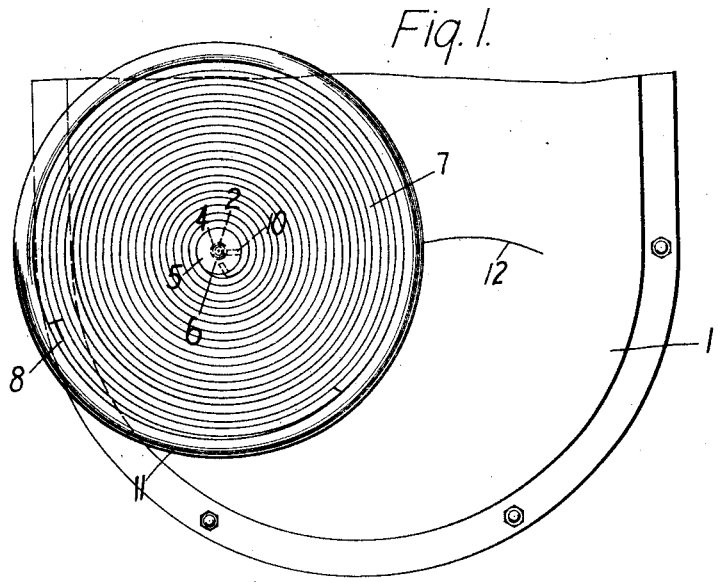
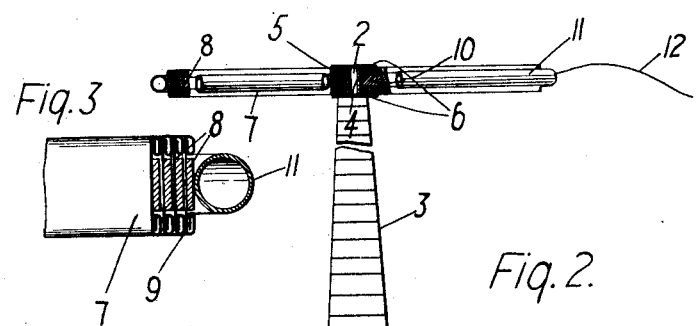
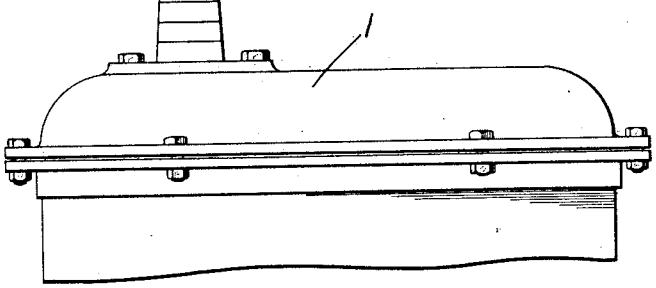
WITNESSES:
INVENTOR
BY
ATTORNEY

UNITED STATES PATENT OFFICE.

JESSE E. MATEER, OF WILKINSBURG, PENNSYLVANIA, ASSIGNOR TO WESTINGHOUSE ELECTRIC AND MANUFACTURING COMPANY, A CORPORATION OF PENNSYLVANIA.

PROTECTIVE DEVICE FOR ELECTRICAL APPARATUS.

1,186,815.     Specification of Letters Patent.     Patented June 13, 1916.

Application filed July 17, 1912. Serial No. 710,034.

*To all whom it may concern:*

Be it known that I, JESSE E. MATEER, a citizen of the United States, and a resident of Wilkinsburg, in the county of Allegheny and State of Pennsylvania, have invented a new and useful Improvement in Protective Devices for Electrical Apparatus, of which the following is a specification.

My invention relates to protective devices for electrical apparatus, such as high-potential transformers, circuit-breakers, etc., and particularly to devices that are employed in connection with terminals of such apparatus for protecting the same from high-potential disturbances and for precluding the concentrations thereupon of static lines of force or stresses.

The object of my invention is to provide a device which shall be simple and compact in construction and which shall serve the functions of both a static shield and a choke coil for distributing the static flux and for damping high potential disturbances.

As disclosed in patent application of Charles Le G. Fortescue, Serial No 642,877, filed August 7, 1911, and assigned to the Westinghouse Elec. & Mfg. Company, terminal leads of high-potential transformers and similar apparatus may be provided with conducting disks or plates of smooth contour which extend laterally from the ends of the leads and serve as enlargements thereof for the purpose of distributing the static lines of force or stresses, and preventing their concentration upon comparatively small areas. The said plates or disks therefore serve as static shields. Also, in order to dampen and reduce high-frequency and high-potential electrostatic discharges, and to thereby avoid injury to the insulation of the transformer or other device, it is customary to connect a choke coil in series with the leads of the said devices. The static shield and the choke coil have heretofore been separate and distinct devices, each performing its own function, but, according to the present invention, both functions are performed by a single device which is more compact and economical in construction and occupies less space than two separate devices.

My invention is illustrated in the accompanying drawing, Figure 1 of which is a plan view of a part of a transformer provided with a device constructed in accordance therewith. Fig. 2 is a side view of the transformer, portions of the protective device being shown in section, and Fig. 3 is an enlarged sectional view through a part of the protective device.

The device is here shown as employed in connection with a high-potential transformer 1 having a conducting lead or terminal 2 that projects through its cover and is surrounded, and insulated from the cover, by an insulating bushing 3, that is preferably constructed, of alternate layers of insulating material and tin-foil, such as is disclosed in Patent No. 952,513. The upper end of the lead 2 extends beyond the bushing 3, and is immediately surrounded by a conducting sleeve or bushing 4 that fits the same sufficiently closely to make a good electrical contact therewith, but which is capable of rotation with respect thereto. The bushing 4 is mounted in and surrounded by a wooden or other suitable insulating disk 5, the sides of which are preferably covered with tin-foil 6 or some other suitable conducting material. The insulating disk 5 is surrounded by a flat spirally wound coil 7 of conducting ribbon or strap 8, the convolutions of which are insulated from each other by means of strips of suitable insulating material 9 of somewhat greater width than the conductor 8, and the protruding sides of which are folded inwardly to provide compact insulating coverings for the otherwise exposed edges of the strap 8. The inner end of the coil is seated in a notch or recess in the insulating disk 5, and it is also connected, by means of a suitable strap or jumper 10, to the conducting bushing 4, it being, by this means, connected to the end of the lead 2. The outer end of the coil is soldered, or otherwise connected, to the outer convolution of the coil to form a complete ring, and a second ring of conducting tubing 11 is closely fitted upon, and electrically connected to, the said outer convolution. Before the ring 11 is applied to the coil, the coil is preferably treated with an insulating composition which enters the pores and spaces therein and sets or hardens so as to cement the layers thereof together, and to render the coil self supporting, when mounted in a horizontal position, a suitable material for treating the insulation being bakelite. A conductor 12 which is adapted to be connected to any device to which it is desired to apply the high potential of the transformer, is soldered or otherwise suitably connected to the ring or rim 11, and, by reason of the fact that the coil is rotatively mounted upon the end of the conductor 2, it may be led directly to the said device irrespective of its location with relation to the transformer.

It will be readily understood that coil 7, which is interposed between the transformer and the device to which it is connected, constitutes a choke coil which smooths out or dampens any high-potential or high-frequency discharges which may occur, thereby protecting the transformer from undue voltage strains. Furthermore, the disk formed by the coil constitutes a static shield of large area which distributes the static flux and reduces its density, the ring or rim 11 serving to impart a smooth contour to the edges of the disk and to thereby prevent the concentration of potential stresses thereon.

I claim as my invention:

1. The combination with a conductor and an insulating bushing surrounding the conductor, of a laterally-extending flat coil disposed at one end of the bushing and electrically connected to said conductor to serve as a reactance device and also as a static shield for distributing the potential stresses imposed on said bushing.

2. The combination with a conductor and an insulating bushing therefor, of a flat spirally-wound coil extending laterally from the bushing and electrically connected to said conductor to serve as a reactance device and also as a static shield.

3. The combination with a conductor and an insulating bushing therefor, of a coil comprising a plurality of convolutions extending laterally from the bushing and electrically connected to said conductor, said coil being so shaped as to insure a substantially uniform distribution of electrostatic stresses upon the surfaces of the bushing and and also serve as a reactance device.

4. The combination with a conducting lead, of a flat coil mounted upon and electrically connected to said lead, and a conducting rim for said coil having an electrical connection thereto.

5. The combination with a conducting lead, of a flat coil mounted upon and electrically connected to said lead, and a conducting rim of curved cross section for said coil having an electrical connection thereto.

6. The combination with a conducting lead, of a flat coil embedded in insulating material and provided with a conducting rim, said coil being mounted upon the lead and having its respective ends connected to the lead and to the rim.

7. The combination with a conducting lead, of a flat coil mounted upon and extending transversely to the lead and having its inner end connected thereto, the said coil being embedded in, and retained in shape by, insulating material, and a conducting rim mounted upon the coil and connected to its outer end.

8. The combination with a conducting lead, and an insulating bushing surrounding the same, of a spirally wound coil rotatively mounted upon and extending transversely to the lead and having its inner end connected thereto, the said coil being embedded in, and retained in shape by, insulating material, and a conducting rim mounted upon the coil and connected to its outer end.

9. The combination with a conducting lead, of a coil mounted upon the lead and having its inner end connected thereto, and a conducting rim mounted upon the coil and connected to its outer end.

10. The combination with a conductor and an insulating bushing surrounding the conductor, of a coil supported upon one end of the bushing and electrically connected to said conductor to serve as a reactance device, said coil being so positioned that the axis of the flux-volume generated by the current flow through the coil is substantially parallel to the axis of the bushing.

11. The combination with a conductor and an insulating bushing surrounding the conductor, of a coil supported upon one end of the bushing, laterally extending therefrom and electrically connected to said conductor to serve as a reactance device, said coil comprising convolutions the planes of which are substantially perpendicular to the axis of the bushing.

12. The combination with a conductor and an insulating bushing therefor, of a flat coil supported upon one end of the bushing, extending laterally therefrom and electrically connected to said conductor to serve as a reactance device, the plane of said coil being substantially perpendicular to the axis of the bushing.

In testimony whereof, I have hereunto subscribed my name this 3rd day of July 1912.

JESSE E. MATEER.

Witnesses:
 GORDON A. BURR,
 B. B. HINES.